(12) United States Patent
Shabtai et al.

(10) Patent No.: US 10,091,220 B2
(45) Date of Patent: Oct. 2, 2018

(54) PLATFORM FOR PROTECTING SMALL AND MEDIUM ENTERPRISES FROM CYBER SECURITY THREATS

(71) Applicant: DEUTSCHE TELEKOM AG, Bonn (DE)

(72) Inventors: Asaf Shabtai, Hulda (IL); Yuval Elovici, D.N. Lachish (IL); Christoph Peylo, Damme (DE); Barak Chizi, Ashkelon (IL); Barak Zacharish, Kfar-Saba (IL); David Mimran, Tel Aviv (IL); Tobias Glemser, Gaufelden (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/393,272

(22) Filed: Dec. 29, 2016

(65) Prior Publication Data
US 2017/0195349 A1   Jul. 6, 2017

(30) Foreign Application Priority Data
Dec. 31, 2015   (IL) .......................................... 243426

(51) Int. Cl.
*H04L 29/06*   (2006.01)

(52) U.S. Cl.
CPC ...... *H04L 63/1416* (2013.01); *H04L 63/1425* (2013.01)

(58) Field of Classification Search
CPC ........................ H04L 63/1416; H04L 63/1425
See application file for complete search history.

(56) References Cited

U.S. PATENT DOCUMENTS

| | | | |
|---|---|---|---|
| 7,647,622 B1 * | 1/2010 | Sobel | H04L 63/1425 709/229 |
| 8,316,438 B1 * | 11/2012 | Bush | H04L 12/66 726/22 |
| 2005/0257267 A1 * | 11/2005 | Williams | H04L 63/1408 726/25 |
| 2006/0075503 A1 | 4/2006 | Bunker et al. | |
| 2012/0005542 A1 * | 1/2012 | Petersen | G06F 11/0709 714/48 |
| 2013/0283336 A1 | 10/2013 | Macy et al. | |
| 2013/0298192 A1 * | 11/2013 | Kumar | G06F 21/52 726/3 |
| 2013/0347085 A1 | 12/2013 | Hawthorn et al. | |
| 2015/0213268 A1 * | 7/2015 | Nance | G06F 21/577 726/1 |

* cited by examiner

*Primary Examiner* — Meng Li
(74) *Attorney, Agent, or Firm* — Leydig, Voit & Mayer, Ltd.

(57) ABSTRACT

A device for protecting a network environment from cyber security threats includes a processing unit and a non-transitory memory having processor-executable instructions stored thereon. The processing unit is configured to execute the processor-executable instructions to: (a) perform one or more auditing stages for examining and analyzing network devices by retrieving information, via a network adapter, from each of the network devices, so as to enable automatically monitoring, scanning and learning the network environment and its security configurations; (b) generate a cyber-security check report that reflects the results of the one or more auditing stages; and (c) give recommendations according to the report in order to increase a security level of the network.

11 Claims, 3 Drawing Sheets

PLATFORM FOR PROTECTING SMALL AND MEDIUM ENTERPRISES FROM CYBER SECURITY THREATS

CROSS-REFERENCE TO RELATED APPLICATIONS

Priority is claimed to Israeli Patent Application No. IL 243426, filed on Dec. 31, 2015, the entire disclosure of which is hereby incorporated by reference herein.

FIELD

The present invention relates to the field of cyber security systems. More particularly, the invention relates to a platform for protecting small and medium enterprises (SME) from cyber security threats.

BACKGROUND

Small and medium enterprises (aka SME) are a common target for cyber security threats and attacks just like any other organization. In addition they do not have a proper solution time, expertise and infrastructure to handle security challenge. This is mainly due to the lack of economy of scale in the market of cyber security products which were built for large organizations and consuming large amount of resources. One of the most important assets of an organization in general and for a SME in particular is information. Information is an important value, and must therefore be protected appropriately. Most information today is created, stored, transported, or processed in part using information technology (IT). IT security incidents such as the disclosure or manipulation of information can have wide-ranging, adverse effects to a business or can prevent the organization from performing its tasks, resulting in high costs. Adequate and appropriate level of security for IT systems can be achieved by obtaining security standards (i.e. International Organization for Standardization/International Electrotechnical Commission (ISO/IEC) 27001). However, the process of IT security certification involves many manual steps.

Today, numerous applications and services are available from different entities and can be deployed on computers in an organization. In other words, various entities including device vendors, network providers, and software vendors can effectively provide computer code and support the operation of computers (servers, terminal devices, etc.). As a result, providing a safe and manageable computer environment requires addressing numerous challenges, in particular for SME.

SUMMARY

In an exemplary embodiment, the invention provides a device for protecting a network environment from cyber security threats, comprising a processing unit and a non-transitory memory having processor-executable instructions stored thereon. The processing unit is configured to execute the processor-executable instructions to: (a) perform one or more auditing stages for examining and analyzing network devices by retrieving information, via a network adapter, from each of the network devices, so as to enable automatically monitoring, scanning and learning the network environment and its security configurations; (b) generate a cyber-security check report that reflects the results of the one or more auditing stages; and (c) give recommendations according to the report in order to increase a security level of the network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 3A and 3B illustrate examples of input and output of the automatic assessment process, according to an embodiment of the invention;

DETAILED DESCRIPTION

Figure 1:
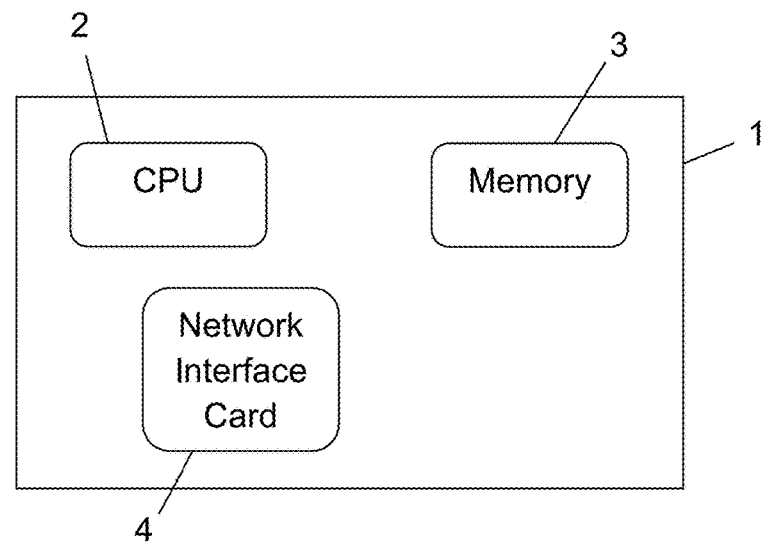
FIG. 1 schematically illustrates a Virtual Security Officer (VSO) device, according to an embodiment of the invention.

Exemplary embodiments of the invention provide improved techniques for serving or managing computing environments, in particular providing Virtual Security Officer (VSO) in computing environment at SME.

In an exemplary embodiment, the invention provides a device for enabling an automatic assessment which helps customers (SME) to determine their individual Cyber Security Exposure/Risk/Threat level.

In an exemplary embodiment, the present invention provides a device which is capable of automatically employing preparation for Cyber Security Check (CSC) standards such as a specific certification from German based Federal Office for Information Security (abbreviated in German as BSI) and Information Systems Audit and Control Association (ISACA).

The present invention relates to a device for protecting networked environment from cyber security threats, wherein said device is operable to: (a) perform one or more auditing stages that examine and analyze the network by retrieving information from network devices, thereby allowing to automatically monitor, scan and learn the network and its security configurations; (b) generate a cyber-security check report that reflects the results of the one or more auditing stages; and (c) give recommendations according to said report in order to increase the security level of the network.

According to an embodiment of the invention, the device is further operable to initiate a first audit stage which is operable to automatic discovery of hosts, operating system (OS), running services and open ports.

According to an embodiment of the invention, the device is further operable to initiate a second audit stage which is operable to access active directory for analysis of Password Settings Objects (PSO) and secure log-in policies.

According to an embodiment of the invention, the device is further operable to initiate a third audit stage which is operable to query Windows Management Instrumentation (WMI) interface on remote workstations (that are operated under Microsoft Windows Operating System) that were discovered during a network scan with the purpose of detecting anti malware applications.

According to an embodiment of the invention, the device is further operable to initiate a fourth audit stage which is operable to query WMI interface on remote Windows devices, Secure Shell (SSH) interface on remote Linux devices hosting Apache or Sendmail applications, with the purpose of scanning event logs and assessing the presence or amount of unusual or suspicious events.

According to an embodiment of the invention, the device is further operable to initiate a fifth audit stage which is operable to query WMI and PowerShell interfaces on remote Windows devices to detect patch level, wherein the patch assessment is performed for Microsoft products and for 3rd party applications.

According to an embodiment of the invention, the device is further operable to initiate a sixth audit stage which is operable to attempt to send sensitive synthesized information via Simple Mail Transfer Protocol (SMTP) and Hypertext Transfer Protocol (HTTP) protocols.

According to an embodiment of the invention, the cyber-security check report is a process that includes retrieval of the finished auditing stages, its outcome, status, summary and score.

According to an embodiment of the invention, the device is further operable to initiate a component for the protection of network gateways which is operable to present the user with the results of an audit network process, wherein the results are retrieved and analyzed, and accordingly a host that has a high number of open ports or its firewall status is disabled, is classified as high risk level.

According to an embodiment of the invention, the device is further operable to initiate a component for the protection against malware which is operable to present the user with the results of an audit security products process.

According to an embodiment of the invention, the auditing stages are computing components that include one or more application programs and/or tasks.

In another aspect, the present invention relates to a method for protecting a network environment from cyber security threats, comprising: a) performing, by a processing unit, one or more auditing stages for examining and analyzing network devices by retrieving information, via a network adapter, from each of said network devices, as to allow to automatically monitor, scan and learn the network and its security configurations; b) processing said information for generating a cyber-security check report that reflects the results of the one or more auditing stages; and c) providing recommendations according to said report, thereby enabling to increase the security level of the network.

The present invention provides a Virtual Security Officer (VSO) device that automates and lowers the manual efforts needed for CSC certification. The VSO device connects to the customer computer network on site and performs one or more auditing stages that examine and analyze the network. The VSO device helps qualified standard assessors and self-auditors to determine the individual Cyber Security Exposure/Risk/Threat level. It may automatically monitor, scan and learn the customer network and security configurations, and in turn the VSO generates a cyber-security check report that reflects the standard audit report and give recommendations to the user in order to increase the security level. According to an embodiment of the invention, the VSO User Interface (UI) can be accessible via web browser. Examples for UI interfaces that may interact with the VSO are described hereinafter in details with respect to FIGS. 3A, 3B and 4.

The VSO device can be implemented in the network as a dedicated standalone device or as software adapted to be installed on a computer in the network.

The terms Windows devices or Windows workstations refer herein to computers based devices such as Personal Computers (PC), laptops, tablets, servers or other devices that are operated under Microsoft® Windows® Operating System (OS) by Microsoft®.

The terms Linux devices or Linux machine refer herein to computers based devices such as Personal Computers (PC), laptops, tablets, servers or other devices that are operated under Linux OS.

The following discussions are intended to provide a brief, general description of a suitable computing environment in which the invention may be implemented. While the invention will be described in the general context of program modules that execute in conjunction with an application program that runs on an operating system on a computer based device that is configured to operate as a VSO device, those skilled in the art will recognize that the invention may also be implemented in combination with other program modules and computer based devices.

The definitions below describe important concepts which are necessary for understanding the VSO functionalities:

BSI: IT-Grundschutz catalogue—The IT baseline protection approach defined by the German Federal Office for Information Security (FSI).

Guide to Cyber Security Check—A Guide for the Implementation of Cyber Security Checks (CSC) in Companies and Government Agencies that was jointly developed by ISACA Germany Chapter Working Group Information Security and BSI experts.

Cyber Security Exposure—In order to carry out an initial risk assessment for the organization to be assessed, the cyber security exposure is determined prior to the on-site assessment. This can be achieved via filling a questionnaire that assists management to work out real concern/risk, determine the need for protection, and on this basis to define the aspired Cyber-security level.

Network Segment—A network segment is a portion of a computer network. The nature and extent of a segment depends on the nature of the network and the device or devices used to interconnect end stations.

Network Discovery—Network Discovery gathers information about devices on the network, besides computers, it also finds network devices such as printers, routers, and bridges. Basically, the Network Discovery method finds any device on the network that has an Internet Protocol (IP) address.

Directory Service—A directory service is the software system that stores, organizes, and provides access to information in a computer operating system's directory.

Active Directory—Active Directory (AD) is a directory service that Microsoft developed for Windows domain networks and is included in most Windows Server operating systems as a set of processes and services. An AD domain controller authenticates and authorizes all users and computers in a Windows domain type network—assigning and enforcing security policies for all computers and installing or updating software. For example, audit policies compliance stage can done using the data found in active directory database.

LDAP—The Lightweight Directory Access Protocol (LDAP), application protocol for accessing and maintaining distributed directory information services over an Internet Protocol (IP) network.

Security Products—Security products refer to software used to prevent, detect and remove malicious software. Common types of security products are: Antivirus, Antispyware and Firewall software.

Patch Level—a patch is a piece of software designed to update a computer program or its supporting data, to fix or improve it. Patch level refers to the list of software patches that are either installed or missing.

Data Leakage Prevention—Data leak prevention (DLP) is aimed at stemming the loss of sensitive information.

The main purpose of the VSO device is to generate a cyber-security check (CSC) report. For that purpose, the VSO may perform several auditing stages such as scans the network, gathers information, analyzes it and generates the CSC report. Some of the auditing stages may require credentials of an account with administrator read permissions (e.g., audit policies compliance, audit security products, audit logs and audit patch level stages may require administrator read privileges).

The VSO device may perform one or more auditing stages, such as the following auditing stages:

Audit network—automatic discovery of hosts, OS, services, open ports using port scanning techniques.

Audit policies compliance—audit password and login policies enforced by active directory services. Access active directory for analysis of Password Settings Objects (PSO) and secure log-in policies.

Audit security products—query WMI interface on remote Windows workstations that were discovered during the network scan with the purpose of detecting anti malware applications (antivirus, antispyware and firewalls). Requires administration access privileges and WMI remote access enabled on workstations.

Audit logs—query WMI interface on remote Windows devices and SSH interface on remote Linux devices hosting Apache or Sendmail applications with the purpose of scanning event logs and assessing the presence or amount of unusual or suspicious events.

Audit patch level—query WMI and PowerShell interfaces on remote Windows devices to detect patch level. Patch assessment is performed for Microsoft products (OS, Office, Internet Explorer (IE), etc.) and for 3rd party applications (Adobe Reader, Firefox, etc.)

Audit Data Leakage Prevention—attempts to send sensitive synthesized information (payroll form, passwords, credit card number (CCN), Social Security number (SSN), etc.) via Simple Mail Transfer Protocol (SMTP) and Hypertext Transfer Protocol (HTTP) protocols.

The auditing stages described herein are provided only as examples for possible components that can be used to examine and analyze the network and the network devices. However, as will be appreciated by a person skilled in the art, other auditing stages can also be applied in order to examine and analyze the network in order to retrieve practically any information about network computers, e.g., via WMI, remote registry, file system, service manager, as well as Simple Network Management Protocol (SNMP), HTTP, NetBios, etc.

The VSO may use the information gathered by the scan to generate a CSC report that reflects the standard audit report as defined for example by BSI or ISACA. The report may point out items that are not compliant with the standard. This will enable a user to correct these items and as a result to be more secured and more prepared for certification.

The VSO device of the present invention may perform the following tasks:

Automatic assessment which helps customers (SME) to determine their individual Cyber Security Exposure/Risk/Threat level. This will be done mainly by detailed reporting.

Automatic comparison against structured information, derived of sources of such as certification schemes, collection of industrial best practices, guidelines, and recommendations.

Automatic monitoring and scanning which learns the customers network with the help of a piece of technology (software (SW), SW/hardware (HW), etc.). This can be done mainly by detailed dashboarding.

Recommendation for customers in order to increase the level of security.

Automatic Assessment

The automatic assessment may collect information from two kinds of data sources that can be used as assessments input—static and dynamic:

1. Static data source—using static tools like questionnaire which can reflect the interfaces to the network, nature of the data management and the network components.

2. Dynamic data source—using software that can obtain metrics and properties of the network.

The above data sources may serve as the main input for the assessment process, where the next phase is to obtain score which reflects the cyber threat. This can be done by using any standard or rule based knowledge which can reflect the importance of each property in the network.

Figures 3A, 3B:
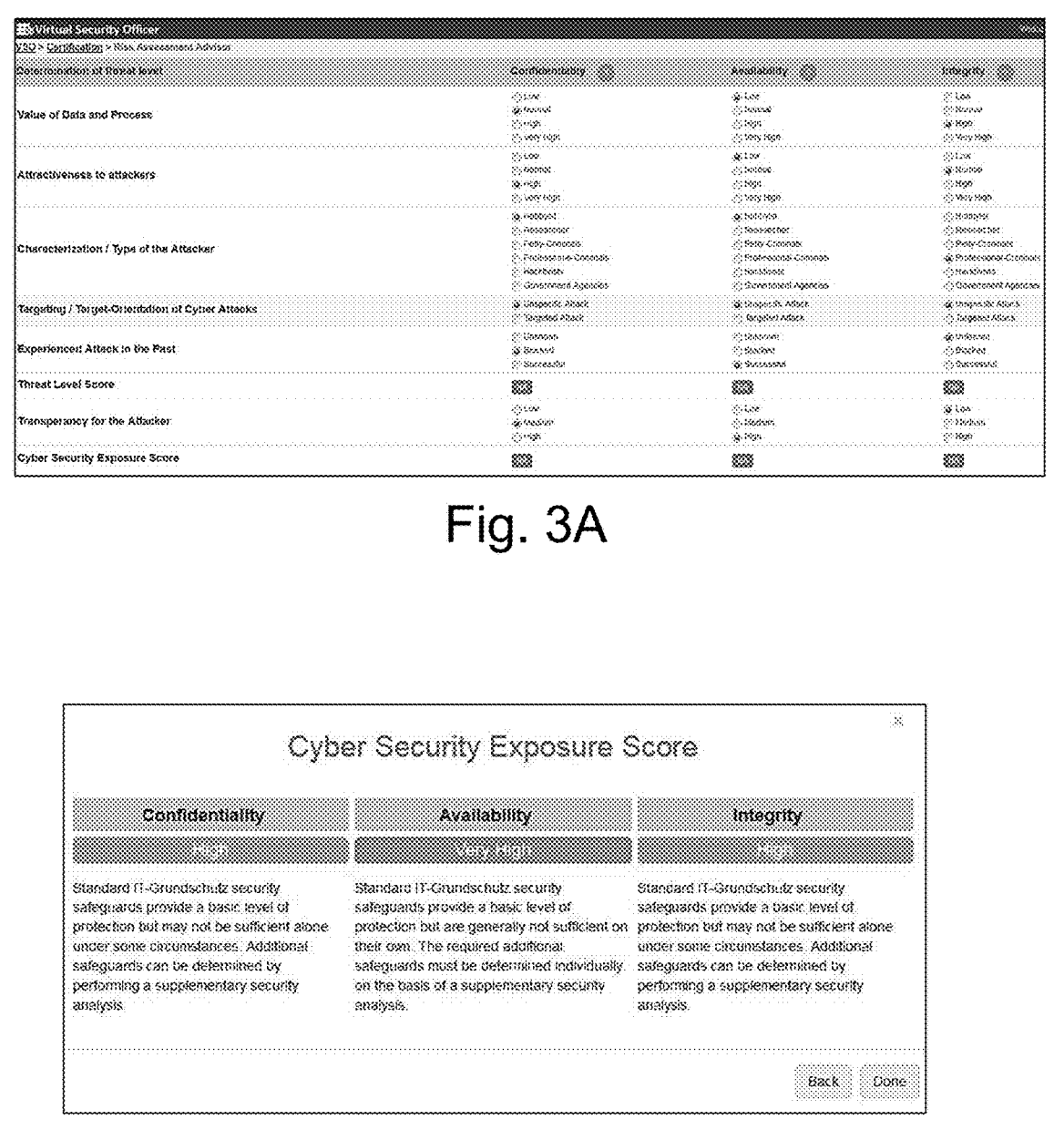

FIGS. 3A and 3B illustrate examples of input and output of the automatic assessment process, according to an embodiment of the invention. FIG. 3A shows the determination of threat level in aspects of confidentiality, availability and integrity. The threat level can be defined by the following properties: value of data and process (e.g., low, normal, high or very high), attractiveness to attackers (e.g., low, normal, high or very high), type of the attacker (e.g., hobbyist, researcher, petty-criminal, professional-criminal, hacktivist or government agency), target orientation of cyber-attack (e.g., unspecific attack or targeted attack), experienced attack in the past (e.g., unknown, blocked or successful), threat level score, transparency level for the attacker (e.g., low, medium or high), cyber-security exposer score, etc. In this embodiment, the assessment is done by filling a structured questionnaire as defined in FIG. 3A.

Automatic Comparison

Automatic comparison is based upon structured information given by a reference scheme, such as certification schemes, regulations, collection of industrial best practices, guidelines, and recommendations within cyber security. The comparison is a process where the degree of compliance between information obtained by the self-assessment and the structured information (certification scheme, regulation) is computed. According to an embodiment of the invention, the comparison is mainly based on both assessments input: static and dynamic. Based on the comparison result a document is generated and issued that explains the degree of compliance with the reference scheme. This may include a formal certificate if the reference scheme allows mapping comparison results to certification levels of a scheme owner. According to an embodiment of the invention, both processes are based on the comparison, can be performed at the user side by the VSO (and not by a third party).

Automatic Monitoring and Scanning (AMS)

Automatic monitoring and scanning can provide the user a local service of cyber security. This is enabled due to an AMS component that can be implemented by software, hardware or combination thereof. The AMS component may execute set of assessment tools together with monitoring interface that can be accessible to the user.

Monitoring tools can be provided by a rich dashboard, a detailed report which is generated by trigger or by an alert on pre-defined events. In addition, anomaly detection tools can be combined with the AMS component, enabling the user to experience an alert cause by an abnormal situation which was not pre-defined.

Figures 4, 5:
FIG. 4 shows an example for a possible layout of a monitoring screen that indicates the inventory of an IT system, including an online indication regarding its status.
FIG. 5 schematically illustrates a VSO-Certificate, according to an embodiment of the invention.

FIG. 4 shows an example for a possible layout of a monitoring screen that indicates the inventory of an IT system, including an online indication regarding its status. The inventory may include the following indication: IP address of each networked device, hostname, device type (e.g., PC or mobile phone), Operating System (OS) and its version, installed Service Pack (SP), last boot time, open ports, etc. In some embodiments, target Windows OS based machines may require operational and configured WMI and PowerShell interfaces open for remote connection with the VSO device.

The audit network may use the following settings for scanning the network:
 Scan of most common TCP ports;
 Detection of OS type; and
 Detection of what services and versions are running.
 Recommendation The recommendation describes set of instruction for immediate action. This can be done by pointing out directly upon an alert with detailed instructions what is needed to be done. This set of instructions may include updating instructions of certain component, removing hardware or software from the system or even pointing out that a specific expert (e.g., a third party provider) should come for any maintenance or preventing task.

With respect to the example processes described hereinabove, not all the process states need to be reached, nor do the states have to be performed in the illustrated order. Further, certain process states that are illustrated as being serially performed can be performed in parallel.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

All the above will be better understood through the following illustrative and non-limitative examples.

FIG. 1 shows a device that can be used in conjunction with the invention. The device illustrated in this figure is particularly convenient because it can be configured as a VSO device that can be applied as an add-on device to an existing SME network without the need to carry any alterations in the structure of the network. The VSO device generally indicated by numeral 1 in the figure comprises a central processing unit (CPU) 2, a memory 3 and a Network Interface Card (NIC) 4 or other network adapter or component that can connect device 1 to a computer network.

The invention is practiced in distributed computing environments where tasks are performed by remote processing devices that are linked through a communications network.

According to an embodiment of the invention, NIC 4 is an operational network interface card with active connection to the internet.

According to some configurations, VSO device 1 is a Windows OS based device that may use the following components/software: Windows Management Instrumentation (WMI), PowerShell and Network Mapper (NMap).

According to an embodiment of the invention, VSO device 1 may require external interface connection to the user's active directory via LDAP protocol using a simple bind connection which means the client must be successfully authenticated. In such embodiment, Server Message Block (SMB) protocol may also be enabled. The user must provide VSO device 1, an administrator read privileges valid for both interfaces to be able to perform the Audit policies compliance stage.

VSO device 1 may require remote access to WMI and PowerShell on Windows based machines and an administrator read privileges to be able to perform Audit security products, Audit logs and Audit patch-level stages.

VSO may require Internet connection and the ability to send data outside the SME network via SMTP and HTTP protocols.

Figure 2:
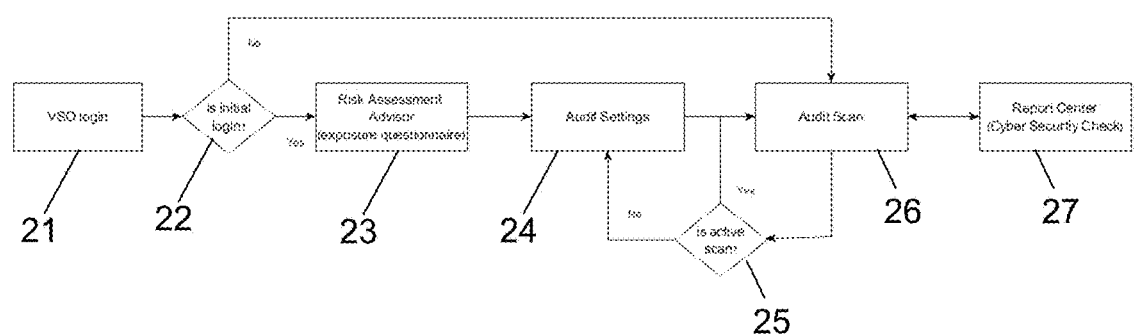
FIG. 2 is a flowchart generally illustrating the method of the invention.

According to an embodiment of the invention, the processes and features encapsulated in the VSO device 1 may provide two major features for getting ready for CSC certification: Risk assessment advisor (cyber-security exposure questionnaire) and live auditing feature. FIG. 2 is a flow chart illustrating the usability flow of the VSO device 1, according to an embodiment of the invention. At first, block 21, the user login the VSO. If this is an initial login (block 22) the user will be directed to the risk assessment advisor view (block 23). If this not an initial login, the user will be directed to the Live auditing view (block 26).

At the risk assessment advisor view (block 23), the assessment is done by enabling the user to fill a structured questionnaire (e.g., as defined in FIG. 3A). The user provides the required information for the assessment via a UI interface by selecting the answers to the questions he is presented with. After filling the questionnaire, three processes are performed as part of this function:
 Calculation of Threat Level Score (TLS). For example—
  In the "Determination of Threat Level" for the "Confidentiality" section (as seen in FIG. 3A) these can be the possible answer with the score for each answer in brackets:
  Value of Data & Processes—Low (0), Normal (1), High (2), Very-High (4)
  Attractiveness for Attackers—Low (0), Normal (1), High (2), Very-High (4)
  Type of Attacker—Hobbyist (0), Researcher (1), Petty Criminals (2), Professional-Criminals (4), Hacktivist (4), Government Agencies (5)
  Targeting of Cyber Attacks—Unspecific Attack (1), Targeted Attack (2)
  Experienced Attacks in the Past—Unknown (1), Blocked (3), Successful (5)
 In this example, the threat level score is the sum of the scores from every section but the maximus score is 5.
 Calculation of the cyber security exposure score that considers the threat level score For example, this calculation can be based on the Threat Level Score (TLS) and the answer to "Transparency for the Attacker". In this example, there are 3 possible answers: Low (−1), Normal (0), High (1)
 The score is added to the score of every section (Confidentiality, Integrity, and Availability)

For example: if the score in Confidentiality section is 5 and "Transparency for the Attacker" is Low than the Cyber Security Exposure Score will be 4.

Selection of assessment remarks with relation to the calculated cyber security score.

The output is a cyber-security exposure score for each of the three objectives: Confidentiality, Availability and Integrity accompanied by an assessment remark in aspect of the required safeguards. The score determines what types of safeguards are required in order to gain an adequate security level. In case of a normal score, the normal safeguards described in the IT-catalogue are sufficient. In cases of high (e.g., as indicated in FIG. 3B) or very high (e.g., as indicated in FIG. 3B) scores, supplementary safeguards should/must be considered. The cyber-security-exposure score will be displayed in the final auditing report.

At the next step, block 24, audit settings enables the user to enter and modify VSO audit settings. The settings are a prerequisite for operating the live auditing feature. For example, if the user decides to skip this stage without providing access accounts and network applications, VSO may perform a partial audit scan.

There are two types of entities within the audit settings view:

Access accounts—accounts that will be used for auditing remote Windows based devices.

Network applications—profiles of network application that are supported by the VSO audit process: Active directory, Sendmail on Linux device, Apache on Linux device At this stage, the user may add entities. The user can proceed to live auditing. If no account or applications are defined, the following audit stage will be skipped: audit policies compliance, audit security products, audit logs and audit patch level. The following audit stages will be performed: audit network and audit data leakage prevention.

Live auditing is the second out of two main functional requirements of the VSO device. The live auditing is the main feature of the VSO device. It enables the user to perform several stages auditing process (e.g., six) which generates the cyber-security check report. The report elaborates on different items that are not compliant, provides information on the standard requirements and recommendations. This enables the user the update the audited items to comply with the standard and to be more prepared for certification.

Examples for possible stages of an Audit scan, block 26, are described in the following paragraphs. The VSO checks whether the Audit scan is active, block 25, and if not it may return to the Audit setting (block 24).

Audit Network

This feature performs network audit in order to automatically discover hosts in the network, including open ports, OS version, running services and their types. The process may provide dynamic UI that reflects the audit progress and the findings. VSO may perform auto discovery of the device network interface cards that are assigned with IPv4 address. To perform the network scan, address range has to be provided to the scanner. VSO uses the subnet address range of every IPv4 NIC it detects and excludes its own IP address (VSO does not scan itself). The scan profile scans for most common TCP ports.

The processing of audit network includes, triggering the network mapper tool. The mapping process output is piped into the auditing log console. Every newly discovered host can be printed so the user can be updated on the details of the audit network process. At the end of this stage, the VSO tries to access each of the discovered devices using any of the provided access accounts. When a match is found, the account is assigned to the device for the upcoming audit stages. A device that can't be remotely access will not be audited. When the process is finished, a report is generated. The user now can view the report.

The output of this process is a list of network devices by IP that is used as the input for the following audit stages: Audit security products, Audit logs and Audit patch-level. In addition when this process is finished the following reports are generated: Protection of network gateways and Inventory of the IT systems reports.

Audit Policies Compliance

This feature performs audit policies compliance by analyzing password and login policies. These policies can be defined via directory services. This feature support analysis of active directory database, extracting various policy attributes such as minimum password length, password complexity etc. The process provides dynamic UI that reflects the audit progress and the findings. The inputs for this feature are a privileged account with administrator read permission and a domain server name. The processing includes connecting to active directory server, reading selected policy attributes, analysis of these attribute values in comparison with the standard recommendations. For example, the output of this feature can be reports about performance of user-oriented safeguards.

Audit Security Products

This feature performs audit of security products on remote computers such as Windows OS based machines. The process may provide dynamic UI that reflects the audit progress and the findings. For example, the inputs for this feature are accounts (e.g., Windows accounts) with privileged administrator read permissions that enable access to all discovered Windows based devices with the ability to connect remotely via Windows Management Instrumentation (WMI) interface. The processing at this stage may include connecting remotely to workstations that were discovered during the network audit process via WMI interface, querying the database and trying to detect installed anti-malware software.

Audit Logs

This feature may perform audit of logs on Windows OS based machines (workstations and servers), Sendmail deployed on Linux machine, Apache HTTPD deployed on Linux machine, etc. The process may provide dynamic UI that reflects the audit progress and the findings. For example, the inputs for this feature are accounts (e.g., Windows accounts) with privileged administrator read permissions that enable access to all discovered Windows based devices with the ability to connect remotely via Windows Management Instrumentation (WMI) interface, Sendmail and Apache HTTPD network application profile with privileged account to access log file via SSH. The processing at this stage may include connecting remotely to workstations that were discovered during the network audit process via WMI interface, querying the database and trying to detect installed anti-malware software, accessing Sendmail and Apache devices via SSH using the credentials entered by the user, etc.

Audit Patch-Level

This feature performs audit of patch-level on remote Windows based machines. The process may provide dynamic UI that reflects the audit progress and the findings. For example, the inputs for this feature are privileged accounts (Windows accounts) with administrator read permissions that enable access to all discovered Windows based devices with the ability to connect remotely via Windows Management Instrumentation (WMI) interface and PowerShell interface. This feature may require both device interfaces to be accessible in order to perform the scan. The processing at this stage may include connecting remotely to workstations that were discovered during the network audit process to retrieve the patch list for Microsoft products and a list of installed $3^{rd}$ party applications and version numbers. VSO checks compares known $3^{rd}$ party applications version against the latest version and issues a recommendations for update if necessary.

Audit Data Leakage Prevention (aka Hole Punching Indicator)

This feature attempts to send sensitive synthesized information (payroll form, passwords, etc.) via SMTP and HTTP protocols. The inputs for this feature are synthesized information which will be stored within the VSO application. The processing may include attempts to send files with sensitive synthesized information, e.g., via the following channels:

As an attachment via SMTP to a sink server located on the internet.

To upload file via HTTP protocol to a sink server locate on the internet.

The output of this process is a report that indicates which files on which channels were successfully sent and which were blocked. The expected result is that all files will be blocked by the organization's counter measures.

Report center process, block 27 in FIG. 2, is the reflection of the auditing results in the format of the Cyber-Security Check report. The input for this feature is the output the performed auditing stages. The process includes retrieval of the finished auditing stages, its outcome, status, summary and score (in some cases not all features are available), e.g., according to the following:

The status may indicate its compliance and can be one of the followings:
Red—non-compliant
Green—compliant
Grey—not available The summary may show the number of the items within the report that are: compliant, non-compliant or its compliant status is unknown;

Score—each check objective is scored based on the compliance status of the items within it (where possible), and can range from 60 to 100;

The audit scan is assigned with an overall score calculated based on the score of the check objectives, and can range from 60 to 100.

As will be appreciated by a person skilled in the art, as a result of the above processes, the VSO may provide protection of network gateways. This can be done by a process that presents the user with the results of the Audit network process. The results are retrieved and analyzed, and accordingly a host that has a high number of open ports or its firewall status is disabled is classified as high risk level. For example, as an output the VSO may provide a list of items containing the host IP, detect OS (which gives a hint about the host type), scanned port, open inbound ports, filtered ports, and services detected via open ports.

As will be appreciated by a person skilled in the art, as a result of the above processes, the VSO may provide protection against malware. This can be done by a process that presents the user with the results of the Audit security products process. The results are retrieved and analyzed, a host must have some sort of anti-malware software that is up-to-date and the on-access scan is enabled to be considered as complaint. For example, as an output the VSO may provide a list of items containing the host IP, detect antimalware software, up-to-date status, on-access scan status and compliance summary.

As will be appreciated by a skilled person, based on the stages and processes described hereinabove, the VSO may provide the following:

A process that presents the user with the patch level of systems that were discovered during the Audit network process and were able to be accessed using the access accounts entered by the user. A single process that lists the discovery hosts with their gathered patch-level information. For example, using the UI the user can press a device entry to see the device components/software. For each component, complaint status, severity and recommendation can be shown. A list of devices containing the IP, hostname OS version, Service pack and list of retrieved Microsoft patches and $3^{rd}$ party applications which are compliant meaning installation or update is required, e.g., as shown in FIG. 4.

Logged data recording and analysis—A process that present the user with TBD process results. This is done retrieving the audit results and comparing them to the standard requirements. The output is a set of attributes per audited policy. For example, in the UI each attribute has the standard requirement value next to the measured network value and a compliance sign.

A process that present the user with Audit policies compliance process results. This is done by retrieving the audit results and comparing them to the standard requirements. The output is a set of attributes per audited policy. For example, in the UI each attribute has the standard requirement value next to the measured network value, compliance status and recommendations if necessary.

A process that present the user with Audit policies compliance process results. This is done by retrieving the audit results and comparing them to the standard requirements. The output is a set of attributes per audited policy. For example, in the UI each attribute has the standard requirement value next to the measured network value, compliance status and recommendations if necessary.

As a result of the results of an audit scan, the VSO may generate a VSO certificate that is the outcome of an audit scan. The certificate may show the audit final overall score and can be printed by the user. Upon completing the scan, the VSO retrieves the overall audit scan score. The audit scan is assigned with an overall score that is calculated based on the score of the check objectives, and for example it can range from 60 to 100. A UI view that holds the overall score with a button that enables the user to print the certificate is shown in FIG. 5.

Those skilled in the art will appreciate that the invention may be practiced with other computer system configurations that can be used as a VSO device, including hand-held devices, multiprocessor systems, microprocessor-based or programmable consumer electronics, minicomputers, mainframe computers, and the like.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

The invention provides improved techniques for helping the managing and protecting of computing environments. It will be appreciated that the invention provides techniques that are especially useful for SME computing environments. In accordance with one aspect of the invention, a computing environment known or believed to be safe can be provided as a "safe computing environment" for ensuring the safety of a device and/or management of the device. As a result of the report provided by the VSO device of the present invention, various security and management activities can be securely performed to ensure the safety of a device and/or safely perform various management activities for a device.

It will be appreciated that these management operations can, for example, include: monitoring the computing environment to detect, and so on. More generally, various management activities including security enforcement, providing updates and/or configuration services, can be performed by one or more components which can act alone and/or in collaboration, for example, with one or more external sources (e.g., a trusted security sever, a trusted configuration server) to effectively ensure the safety of a device and manage it safely.

It will be appreciated that the management of the one or more computing environments can include effectively managing one or more executable (computing) components executing in the one or more computing environment. The information gathered by the VSO device can be stored in a log (or a database).

It should be noted that computer program code and/or general or specific instructions (general or specific instructions) can effectively be provided by the VSO device in order to initiate management activities for a networked device. In other words, the VSO can initiate communication and effectively provide data to one or more network devices in order to effectively initiate management operations.

All the above description and examples have been given for the purpose of illustration and are not intended to limit the invention in any way. Many different mechanisms and methods of network analysis can be employed, all without exceeding the scope of the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for protecting a network environment from cybersecurity threats, comprising a central processing unit (CPU) and a non-transitory memory having processor-executable instructions stored thereon, the CPU being configured to execute the processor-executable instructions to:
   (a) perform a self-assessment using one or more auditing stages for examining and analyzing network devices by:
      automatically monitoring, scanning and learning the network environment and its security configurations, wherein automatically monitoring, scanning and learning the network environment and its security configurations includes retrieving information, via a network adapter, from each of the network devices; and
      applying static tools which reflect the interfaces to the network, nature of the data management and the network components;
      wherein performing the self-assessment includes attempts to send sensitive synthesized information via Simple Mail Transfer Protocol (SMTP) and Hypertext Transfer Protocol (HTTP) protocols;
   (b) perform an automatic comparison against structured information as given by a cybersecurity reference scheme, wherein a degree of compliance between information obtained by the self-assessment and the structured information is computed;
   (c) generate a cybersecurity check report that reflects results of the one or more auditing stages and the degree of compliance with the cybersecurity reference scheme; and
   (d) output a set of attributes per an audited policy and output recommendations according to the report in order to increase a security level of the network, including an indication of which sensitive synthesized information was successfully sent and which sensitive synthesized information was blocked;
   wherein the CPU is further configured to execute the processor-executable instructions to initiate an audit stage which includes automatic discovery of hosts, operating system (OS), running services and open ports;
   wherein the CPU is further configured to execute the processor-executable instructions to initiate a component for the protection of network gateways which is operable to present results of an audit network process to facilitate retrieval and analysis of the results of the audit network process and classification of a host that has a high number of open ports or has a disabled firewall status as having a high risk level.

2. The device of claim 1, wherein the CPU is further configured to execute the processor-executable instructions to initiate an audit stage which includes accessing active directory for analysis of Password Settings Objects (PSO) and secure log-in policies.

3. The device of claim 2, wherein the CPU is further configured to execute the processor-executable instructions to initiate a component for the protection against malware which is operable to present results of an audit security products process.

4. The device of claim 1, wherein the CPU is further configured to execute the processor-executable instructions to initiate an audit stage which includes querying Windows Management Instrumentation (WMI) interfaces on remote Windows workstations that were discovered during a network scan with the purpose of detecting anti-malware applications.

5. The device of claim 1, wherein the CPU is further configured to execute the processor-executable instructions to initiate an audit stage which includes querying Windows Management Instrumentation (WMI) interfaces on remote Windows devices and/or Secure Shell (SSH) interfaces on remote Linux devices hosting Apache or Sendmail applications, with the purpose of scanning event logs and assessing the presence or amount of unusual or suspicious events.

6. The device of claim 1, wherein the CPU is further configured to execute the processor-executable instructions to initiate an audit stage which includes querying Windows Management Instrumentation (WMI) and PowerShell interfaces on remote Windows devices to detect patch level, wherein the patch assessment is performed for Microsoft products and for third party applications.

7. A method for protecting a network environment from cybersecurity threats, comprising:
 a) performing, by a central processing unit (CPU), a self-assessment using one or more auditing stages for examining and analyzing network devices by:
  automatically monitoring, scanning and learning the network environment and its security configurations, wherein automatically monitoring, scanning and learning the network environment and its security configurations includes retrieving information, via a network adapter, from each of the network devices; and
  applying static tools which reflect the interfaces to the network, nature of the data management and the network components;
  wherein performing the self-assessment includes attempts to send sensitive synthesized information via Simple Mail Transfer Protocol (SMTP) and Hypertext Transfer Protocol (HTTP) protocols;
 b) performing, by the CPU, an automatic comparison against structured information as given by a cybersecurity reference scheme, wherein a degree of compliance between information obtained by the self-assessment and the structured information is computed;
 c) processing, by the CPU, the information for generating a cybersecurity check report that reflects results of the one or more auditing stages and the degree of compliance with the cybersecurity reference scheme; and
 d) outputting, by the CPU, a set of attributes per an audited policy and outputting recommendations according to the report, thereby enabling an increase of a security level for the network environment, including an indication of which sensitive synthesized information was successfully sent and which sensitive synthesized information was blocked;
 wherein the one or more auditing stages includes an audit stage which includes automatic discovery of hosts, operating system (OS), running services and open ports;
 wherein the method further comprises: initiating a component for the protection of network gateways which is operable to present results of an audit network process to facilitate retrieval and analysis of the results of the audit network process and classification of a host that has a high number of open ports or has a disabled firewall status as having a high risk level.

8. The method of claim 7, wherein the one or more auditing stages includes an audit stage which includes accessing an active directory for analysis of Password Settings Objects (PSO) and secure log-in policies.

9. The method of claim 7, wherein the one or more auditing stages includes an audit stage which includes querying Windows Management Instrumentation (WMI) interfaces on remote Windows workstations that were discovered during a network scan with the purpose of detecting anti-malware applications.

10. The method of claim 7, wherein the one or more auditing stages includes an audit stage which includes querying Windows Management Instrumentation (WMI) interfaces on remote Windows devices and/or Secure Shell (SSH) interfaces on remote Linux devices hosting Apache or Sendmail applications, with the purpose of scanning event logs and assessing the presence or amount of unusual or suspicious events.

11. The method of claim 7, wherein the one or more auditing stages includes an audit stage which includes querying Windows Management Instrumentation (WMI) and PowerShell interfaces on remote Windows devices to detect patch level, wherein the patch assessment is performed for Microsoft products and for third party applications.

* * * * *